United States Patent
Harvey et al.

(10) Patent No.: US 11,745,888 B2
(45) Date of Patent: Sep. 5, 2023

(54) AIRCRAFT HYBRID PROPULSION SYSTEM

(71) Applicants: ROLLS-ROYCE plc, London (GB); Rolls-Royce Deutschland Ltd & Co KG, Dahlewitz (DE)

(72) Inventors: Giles E. Harvey, Derby (GB); Gideon Daniel Venter, Berlin (DE)

(73) Assignees: Rolls-Royce plc, London (GB); Rolls-Royce Deutschland, Ltd & Co., Dahlewitz (DE)

( * ) Notice: Subject to any disclaimer, the term of this patent is extended or adjusted under 35 U.S.C. 154(b) by 198 days.

(21) Appl. No.: 16/952,147

(22) Filed: Nov. 19, 2020

(65) Prior Publication Data
US 2021/0179286 A1   Jun. 17, 2021

(30) Foreign Application Priority Data
Dec. 12, 2019   (GB) ..................... 1918281

(51) Int. Cl.
| | |
|---|---|
| *B64D 35/08* | (2006.01) |
| *B64D 27/12* | (2006.01) |
| *B64D 27/02* | (2006.01) |
| *B64D 27/24* | (2006.01) |

(52) U.S. Cl.
CPC ............. *B64D 35/08* (2013.01); *B64D 27/12* (2013.01); *B64D 27/24* (2013.01); *B64D 2027/026* (2013.01)

(58) Field of Classification Search
CPC ... B64D 2027/026; B64D 35/08; B64D 27/12
See application file for complete search history.

(56) References Cited

U.S. PATENT DOCUMENTS

| | | | |
|---|---|---|---|
| 2010/0219779 A1* | 9/2010 | Bradbrook | F02C 7/32 60/773 |
| 2017/0174355 A1* | 6/2017 | Waltner | B64C 27/12 |
| 2017/0225573 A1* | 8/2017 | Waltner | B60L 50/16 |
| 2017/0327219 A1* | 11/2017 | Alber | B64C 29/02 |
| 2018/0283292 A1 | 10/2018 | Steinwandel et al. | |
| 2019/0300186 A1* | 10/2019 | Lieven | B64D 27/02 |
| 2022/0324582 A1* | 10/2022 | LaTulipe | B64D 27/10 |

FOREIGN PATENT DOCUMENTS

| | | |
|---|---|---|
| EP | 2226487 A2 | 9/2010 |
| WO | WO-2017114643 A1 * | 7/2017 |

OTHER PUBLICATIONS

Great Britain search report dated Sep. 8, 2020, issued in GB Patent application No. 1918281.5.
European search report dated Apr. 1, 2021, issued in EP Patent Application No. 20207180.

* cited by examiner

*Primary Examiner* — Timothy D Collins
*Assistant Examiner* — Justin Michael Heston (57) ABSTRACT

An aircraft hybrid propulsion system comprises an internal combustion engine, an electric motor a propulsor and a combining gearbox. The internal combustion engine is coupled to a first input of the combining gearbox, the electric motor is coupled to a second input of the combining gearbox, and the propulsor is coupled to an output of the combining gearbox, such that the propulsor is driveable in use by either or both of the internal combustion engine and the electric motor. Each of the internal combustion engine and the electric motor is coupled to its respective input by a respective clutch.

17 Claims, 9 Drawing Sheets

AIRCRAFT HYBRID PROPULSION SYSTEM

CROSS-REFERENCE TO RELATED APPLICATIONS

This specification is based upon and claims the benefit of priority from United Kingdom patent application number GB 1918281.5 filed on Dec. 12, 2019, the entire contents of which are incorporated herein by reference.

BACKGROUND

Technical Field

The present disclosure concerns a parallel hybrid propulsion system for an aircraft and an aircraft comprising the propulsion system.

Description to the Related Art

Parallel hybrid aircraft have been proposed, in which an internal combustion engine is combined with one or more electric motors to drive one or more propulsors. Parallel hybrid systems can be distinguished from so-called "serial hybrid" systems, in that in a parallel hybrid system, a mechanical connection is provided by the internal combustion engine and at least one propulsor, with at least one electric motor driving either the same propulsor as that driven by the internal combustion engine, or a further propulsor.

SUMMARY

According to a first aspect there is provided an aircraft hybrid propulsion system comprising;
an internal combustion engine;
an electric motor;
a propulsor;
a combining gearbox, the internal combustion engine being coupled to a first input of the combining gearbox, the electric motor being coupled to a second input of the combining gearbox, and the propulsor being coupled to an output of the combining gearbox, such that the propulsor is driveable in use by either or both of the internal combustion engine and the electric motor; wherein
each of the internal combustion engine and the electric motor is coupled to its respective input by a respective clutch.

Advantageously, a single propulsor can be driven by either or both of the internal combustion engine and the electric motor. Furthermore, in the event of a failure of either the electric motor or internal combustion engine, the propulsor can continue to be driven by the other input, in view of the clutches.

One or both of the clutches may comprise any of an overrunning clutch, and an activated clutch such as a friction clutch or fluidic clutch.

The electric motor may comprise one of a permanent magnet motor and an induction motor. The inventors have found that the present disclosure is suitable for a wide variety of motor types, but it particularly suitable for permanent magnet motors. In the event of a permanent magnet motor failure, it is important that the electric motor does not continue to turn. By providing an overrunning clutch, the propulsor can continue to turn, while preventing the motor from turning.

The combining gearbox may comprise a reduction gearbox, wherein at least one of the inputs is configured to turn at a higher speed than the output in use. Advantageously, a relatively fast turning internal combustion engine and/or electric motor can be used in combination with a relatively slow turning propulsor. Such an arrangement provides for relatively efficient, compact electric motors and internal combustion engines, as well as an efficient propulsor.

The combining gearbox may comprise a parallel-axis gearbox comprising first and second input gears, and an output gear, wherein teeth of the first and second input gears mesh with teeth of the output gear.

The combining gearbox may comprise an epicyclic gearbox comprising a sun gear, at least one planet gear, and a ring gear. The propulsor may be coupled to the ring gear, the gas turbine engine may be coupled to one of the sun gear and a planet gear, and the electric motor may be coupled to the other of the planet gear and the sun gear. Advantageously, a large gear reduction can be achieved in a single stage, while a wide range of gear reductions can be provided between the motor and the internal combustion engine. Furthermore, the arrangement may be relatively compact, light and robust.

The combining gearbox may comprise a multi-stage gearbox.

The combining gearbox may comprise a first stage comprising one of a first parallel-axis gearbox and a first epicyclic gearbox, and a second stage comprising one of a second parallel-axis gearbox, and a second epicyclic gearbox.

The epicyclic gearbox may comprise one of a planetary gearbox and a star gearbox. The output gear of the first step-aside gearbox may be coupled to a sun gear of the epicyclic gearbox, and one of a planet carrier and a ring gear of the epicyclic gearbox may be coupled to the propulsor.

The aircraft hybrid propulsion system may comprise one or more of an electric energy storage device and a generator configured to provide electrical power to the electric motor. The generator may be coupled to the internal combustion engine.

The internal combustion engine may comprise a gas turbine engine. The gas turbine engine may comprise a compressor coupled to a first turbine, and may comprise a second turbine. The second turbine may be de-coupled from an engine compressor. The first and/or second turbine may be coupled to one or both of the generator and the combining gearbox.

According to a second aspect there is provided an aircraft comprising the propulsion system of the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

Figure 1:
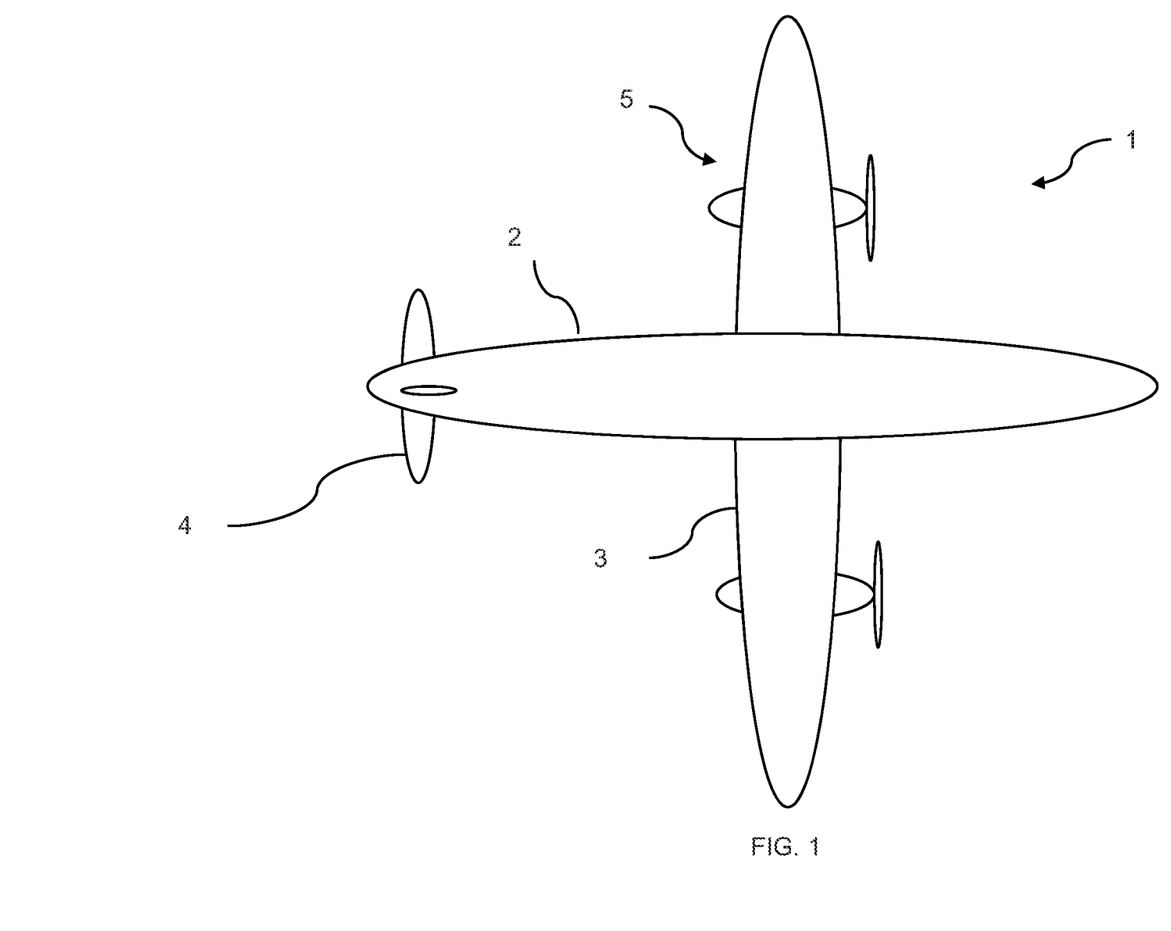
FIG. 1 is a plan view of a first aircraft comprising a parallel hybrid propulsion system.

With reference to FIG. 1, an aircraft 1 is shown. The aircraft 1 is of conventional configuration, having a fuselage 2, wings 3, tail 4 and a pair of propulsion systems 5. One of the propulsion systems 5 is shown in figure detail in FIG. 2.

Figure 2:
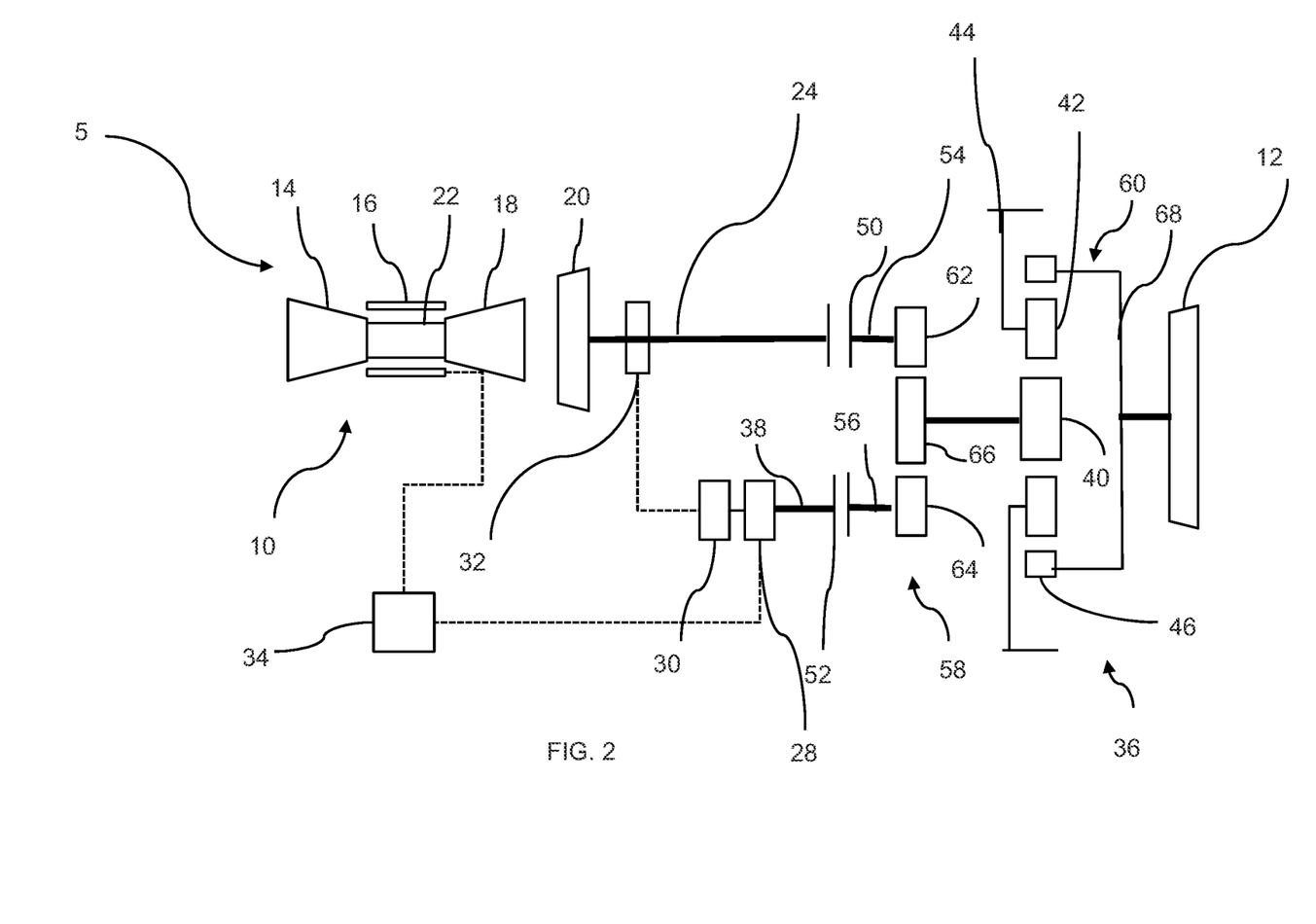
FIG. 2 is a schematic diagram of a parallel hybrid propulsion system for the aircraft of FIG. 1.

FIG. 2 shows the propulsion system 5 schematically. The propulsion system 5 includes an internal combustion engine in the form of a gas turbine engine 10. The gas turbine engine 10 comprises, in axial flow series, a compressor 14, combustion equipment 16 and high and low-pressure turbines 18, 20.

DETAILED DESCRIPTION

The gas turbine engine 10 works in the conventional manner so that air flows through the compressor 14 where it is compressed, before delivering that air to the combustion equipment 16, where it is mixed with fuel and the mixture combusted. The resultant hot combustion products then expand through, and thereby drive the turbines 18, 20 before being exhausted through a nozzle. The high 18 and low-pressure turbines 20 drive respectively the compressor 14 and a propulsor 12 in the form of a propeller or fan, each by suitable interconnecting shaft 22, 24. The low pressure shaft 24 is coupled to the propulsor 12 via a first clutch in the form of an overrunning clutch 50 and a combining gearbox 36, which will be described in further detail later.

Other gas turbine engines to which the present disclosure may be applied may have alternative configurations. By way of example such engines may have an alternative number of interconnecting shafts (e.g. three) and/or an alternative number of compressors and/or turbines. Further, the engine may comprise a gearbox provided in the drive train from a turbine to a compressor and/or fan.

The propulsion system 5 further comprises one or more electrical machines driving the propulsor 12. In particular, the system 5 comprises an electric motor 28. The motor 28 is of a conventional type, such as an induction or permanent magnet electric machine, and is configured to drive a propulsor such as the fan 12. In the present embodiment, the motor 28 comprises a permanent magnet AC motor, and is coupled to the fan 12 via a first motor shaft 38, second clutch in the form of an overrunning clutch 52, second motor shaft 56 and a combining gearbox 36, which will be described in further detail later.

Figure 5:
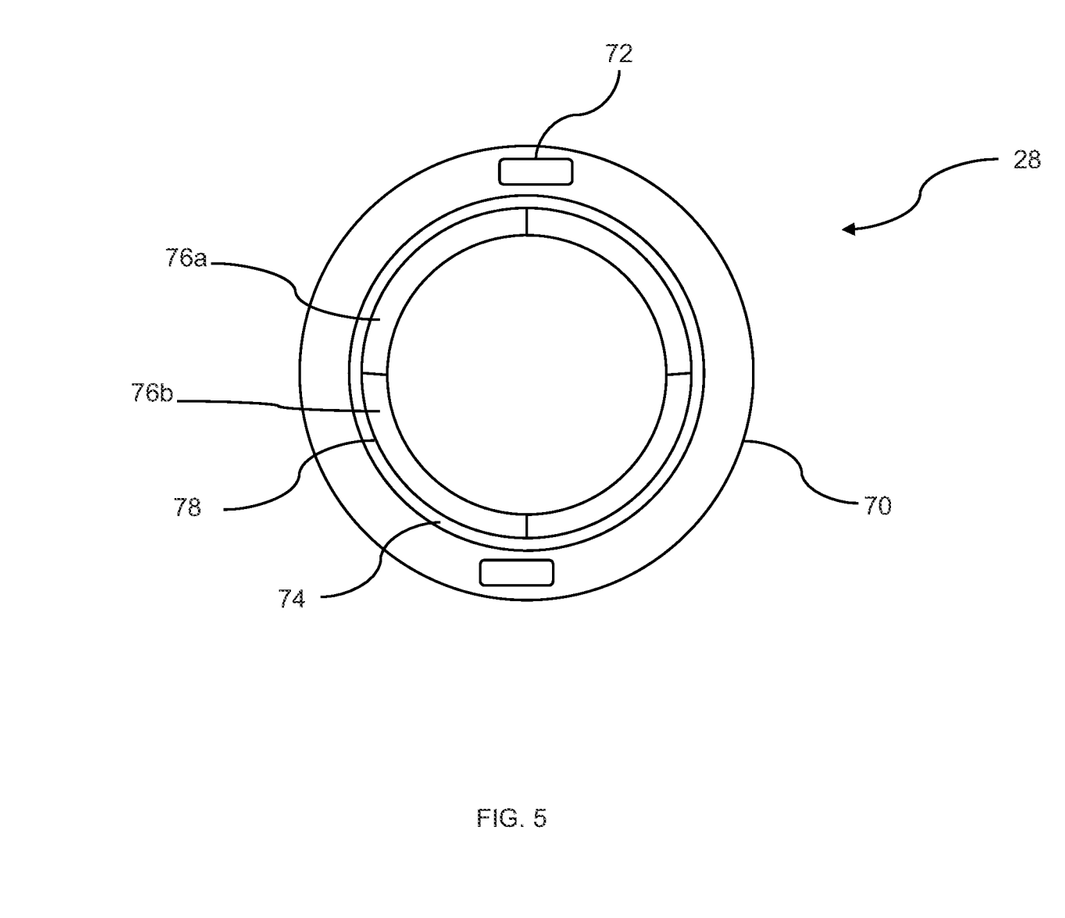
FIG. 5 is a schematic front view of an electric motor of the propulsion system of FIG. 2.

The electric motor 28 is shown in further detail in FIG. 5. The motor 28 is of conventional construction, comprising a stator 70 comprising a plurality of stator coils 72, which are energised in use to produce a rotating magnetic field. This rotating magnetic field crosses an air gap 74 to link with a magnetic field produced by permanent magnets 76a, 76b of a rotor 78. Consequently, the motor 28 acts as a motor when the stators 72 are energised. On the other hand, where the rotor 78 is rotated, the permanent magnets 76a, 76b produce a rotating magnetic field, which links with the stator windings 72 to produce an electric current, and so may act as a generator under some circumstances.

The electric motor 28 is coupled to an energy storage device 30 in the form of one or more of a chemical battery, fuel cell, and capacitor, which provides the electric motor 28 with electrical power during operation. In some cases, multiple energy storages systems, which may be of different types (chemical battery, fuel cell etc.) may be provided for each propulsion system 5. In other cases, a common energy storage device 30 may be provided for multiple propulsion systems.

The propulsion system further comprises a generator 32, which is electrically coupled to one or both of the motor 28 and the energy storage device 30, such that additional electrical energy can be provided in operation. The generator 32 is typically driven by the low-pressure shaft 24 of the gas turbine engine 10.

A controller 34 is provided, which is configured to control at least the motor 28 and energy storage device 30, to control the torque provided by the motor 28, and the charging/discharging of the energy storage device 30. The controller 34 may also be configured to control operation of the generator 32, to control electrical power produced by the generator 32.

As briefly mentioned, the gas turbine engine 10 and electric motor 28 are each coupled to the propulsor via respective first and second overrunning clutches 50, 52, and a combining gearbox 36.

Figure 4:
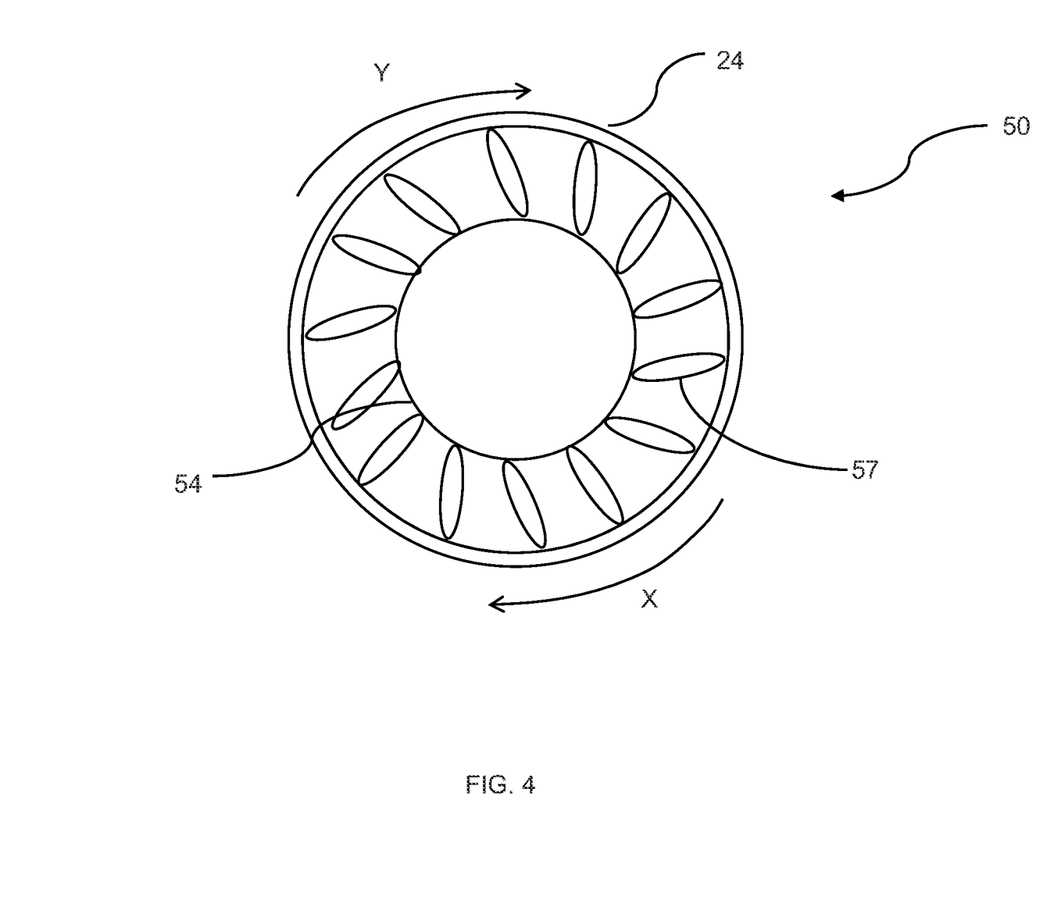
FIG. 4 is a schematic front view of an overrunning clutch of the propulsion system of FIG. 2.

The overrunning clutches 50, 52 are typically in the form of Sprag clutches, although other overrunning clutch types are known.

The sprag clutch comprises an input comprising the low pressure shaft 24 of the gas turbine engine 10. As will be understood, the corresponding component for the clutch 52 will be the motor shaft 38. An output shaft 54 is provided, which is provided radially inward of the input shaft 24. Between the input 24 and output shaft 24, 54, is a plurality of sprags 57, which engage against the shafts 24, 54 when they are relatively rotated in a first direction X, and disengage when rotated in a second direction Y. The clutch 24 is arranged such that the shafts 24, 54 are locked together to transfer torque when the speed of the input shaft 24 is equal to the speed of the output shaft, while the output shaft 54 rotates freely, such that no torque is transmitted back to the input shaft 24, when the output shaft 54 rotates at a higher speed than the input shaft 24. Consequently, torque is transferred from the input shaft 24 to the output shaft 54 only, and not the other way around. Similarly, in view of the second sprag clutch 52, torque is transferred from the first motor shaft 38 to the second motor shaft 56, and not the other way around. Consequently, the motor 28 and gas turbine engine low pressure shaft 24 rotate independently of one another, but both transfer torque to the propulsor 12. Consequently, the fan 12 may be powered by either or both of the gas turbine engine 10 via the low-pressure turbine 20, and the motor 28.

As is well known, a clutch is a device configured to couple rotating devices, which can allow for decoupling. It will be understood that other clutch types could be employed. For example, non-overrunning, switchable clutches could be used.

Figure 6:
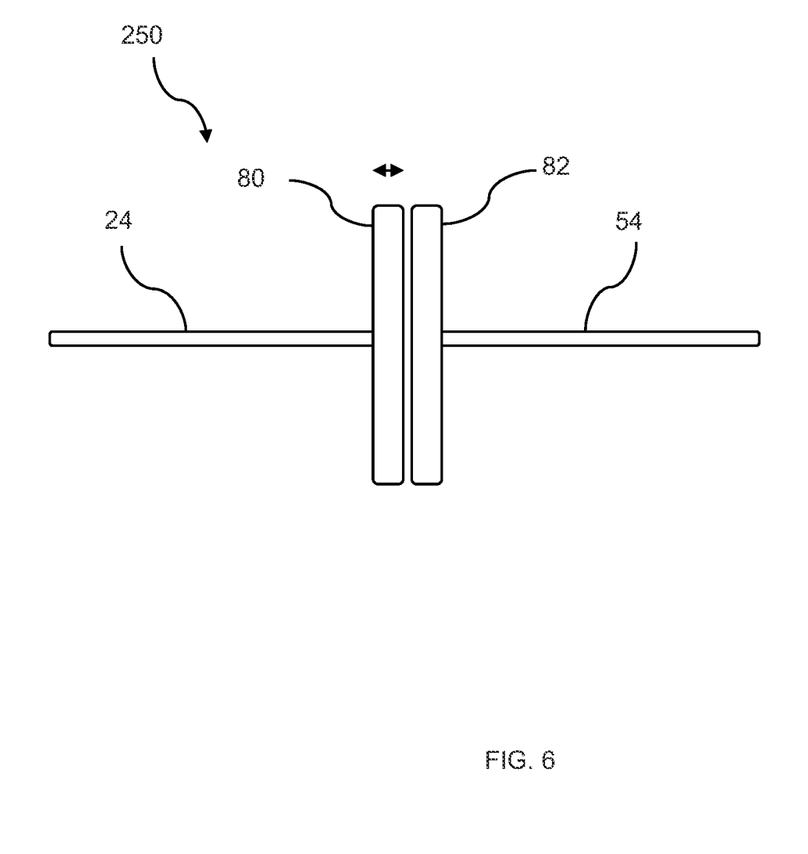
FIG. 6 is a schematic side view of an alternative clutch for the hybrid propulsion system of FIG. 2.

FIG. 6 shows a switchable clutch 250 in the form of a friction clutch, as will be well known to the skilled person. The clutch 250 could replace either of the clutches 50, 52 in the propulsion system 5, and comprises a first friction plate 80 splined to an input shaft (which will comprise either the low-pressure turbine shaft 24 or the motor shaft 38) and a second friction plate 82 splined to an output shaft (shaft 54 or 56). Axial movement of the first friction plate 80 or second friction plate 82 engages and disengages the clutch, to allow for rotation of the input and output shafts together, or independent rotation of the shafts.

Typically, the actuation mechanism (not shown) comprises one or more of an electro-magnetic solenoid, and a hydraulic actuator.

As will be understood, the clutch 250 requires actuation in order to operate, in contrast to the overrunning clutches 50, 52. Consequently, failure of an actuation mechanism to disengage one of the clutches may result in damage to the propulsion system in the event of failure of the internal combustion engine or motor. On the other hand, the clutches may be designed such that such a possibility is sufficiently remote.

One advantage of providing an actuable clutch, is that the electric motor 28 can be used as a generator, to provide electrical power to charge the energy storage device 30 where the thrust requirements are low. Consequently, the engine 10 can be run at a relatively constant speed, with any reduction in thrust requirements being balanced by increased power generation. Such a system may be more efficient, since internal combustion engines (and gas turbine engines in particular) are more efficient at high speed and high load than at low speed/load.

Figure 7:
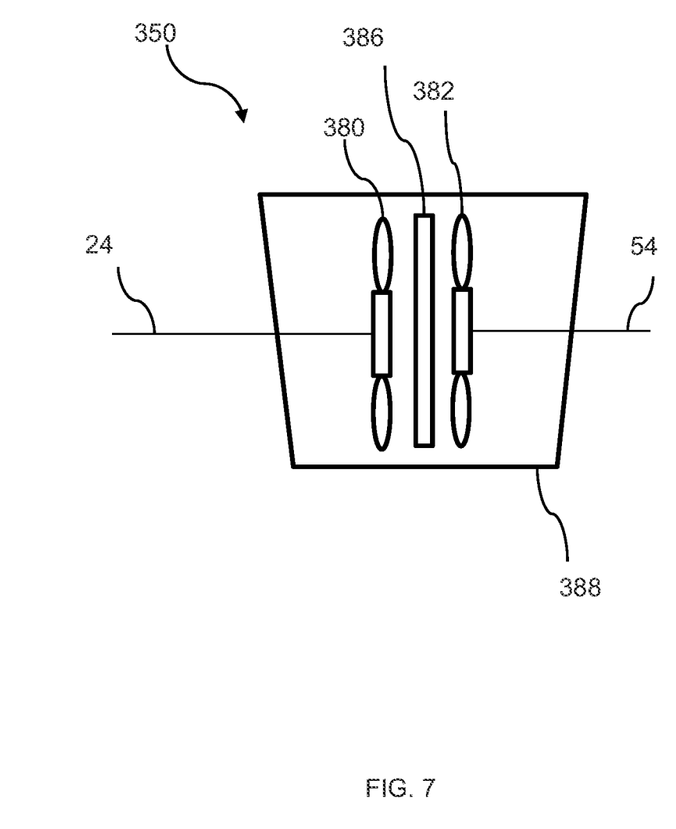
FIG. 7 is a schematic side view of a further alternative clutch for the hybrid propulsion system of FIG. 2.

A further alternative clutch type comprises a fluidic clutch/fluidic coupling. FIG. 7 shows a typical fluidic coupling 350. The coupling 350 comprises an input shaft 24 coupled to an input impeller 380, an output shaft 54 coupled to an output turbine 382, an optional stator 386, which may be provided between the impeller 380 and turbine 382, and a fluid filled housing 388 which houses the impeller 380, turbine 382 and stator 386. The system could also include a mechanical "lockup" clutch (not shown).

The operation of such a fluid coupling is well known. In operation, rotation of the input shaft 24 causes rotation of the impeller 380, which causes swirling of the fluid within the housing 388. This swirling fluid is guided by the stator 386 onto the turbine 382, which causes the turbine 382 to rotate. The relative speeds of the impeller 380 and turbine 382 can be altered by adjusting the angle of the blades of the stator 386, thus providing a torque converter.

In normal use, therefore, rotation of the input shaft 24 causes rotation of the output shaft 54, with a small amount of slip in the fluid coupling 250 causing a slight variation in relative speed of the shafts. However, in the event that one of the shafts 24, 54 becomes locked (such as, for example, failure of the gas turbine engine 10 or electric motor 28), the fluid coupling stalls, thereby preventing significant torque from being transferred. The system may comprise a brake (not shown) configured to brake the input shaft 24, in order to stall the fluid coupling 350, to thereby effectively decouple the shafts 24, 54. Alternatively or in addition, an actuator could be provided to rotate the vane angle of the stator 386, such that rotation of the input impeller 380 does not impart a rotational torque on the turbine 382. A further alternative way to decouple the input and output shafts, is to drain the housing of oil, thereby reducing or eliminating the turning force provided by the impeller.

The combining gearbox 36 is in the form of a multi-stage gearbox, comprising first and second stages 58, 60.

The first stage 58 of the combining gearbox 36 comprises a step-aside gearbox comprising first and second input gears 62, 64, which each mesh with an output gear 66. The first input gear 62 is coupled to the gas turbine engine 10 (in particular, to the low pressure shaft 24 of the gas turbine engine 10) via the output shaft 54. Consequently, the first input gear 62 is coupled to the low pressure shaft 24 via the overrunning clutch 50. Similarly, the second input gear 64 is coupled to the electric motor 28 via the second motor shaft 56. Consequently, the second input gear 64 is coupled to the motor 28 via the overrunning clutch 52.

The first and second input gears 62, 64 typically have fewer teeth and are of a smaller diameter than the output gear 66, such that the step-aside gearbox provides a speed reduction between the electric motor 28 and gas turbine engine low pressure shaft 24, and the output gear 66. Since the gas turbine engine 10 and electric motor 28 are coupled to the step-aside gearbox 58 via separate gears 62, 64, different reduction gearing can be used for the motor 28 and gas turbine engine 10, such that these can operate at different speeds.

This is advantageous for several reasons. Firstly, both the power density and efficiency of gas turbine engines and electric motors can typically be increased by operating these at higher speeds. Typically, turbines (especially those of relatively low power) need to operate at much higher speeds than is optimal for small electric motors. Consequently, by providing separate input gears having different numbers of teeth for the combining gearbox 36, the rotational speed of the gas turbine 10 and motor 28 can be separately optimised. Secondly, propulsors typically operate more efficiently at relatively low rotational speeds. Operation at low rotational speeds also reduces noise. Consequently, each of the gas turbine 10, motor 28 and propulsor 12 can be configured to rotate at an optimal speed.

The output gear 66 of the first stage of the gearbox 36 is coupled to an input of a second stage of the gearbox 36. The second stage of the gearbox comprises an epicyclic gearbox in the form of a star gearbox 60. The star gearbox is shown in further detail in FIG. 3, and comprises an input gear in the form of a sun gear 40, one or more planet gears 42 which mesh with the sun gear, a planet carrier 44 configured to rotatably mount the planet gears 42, and a ring gear 46 which meshes with the planet gears 42. The sun gear 40 is provided at a radially inner position, the ring gear 46 is provided at a radially outer position, and the planet gears 42 are provided therebetween.

Figure 3:
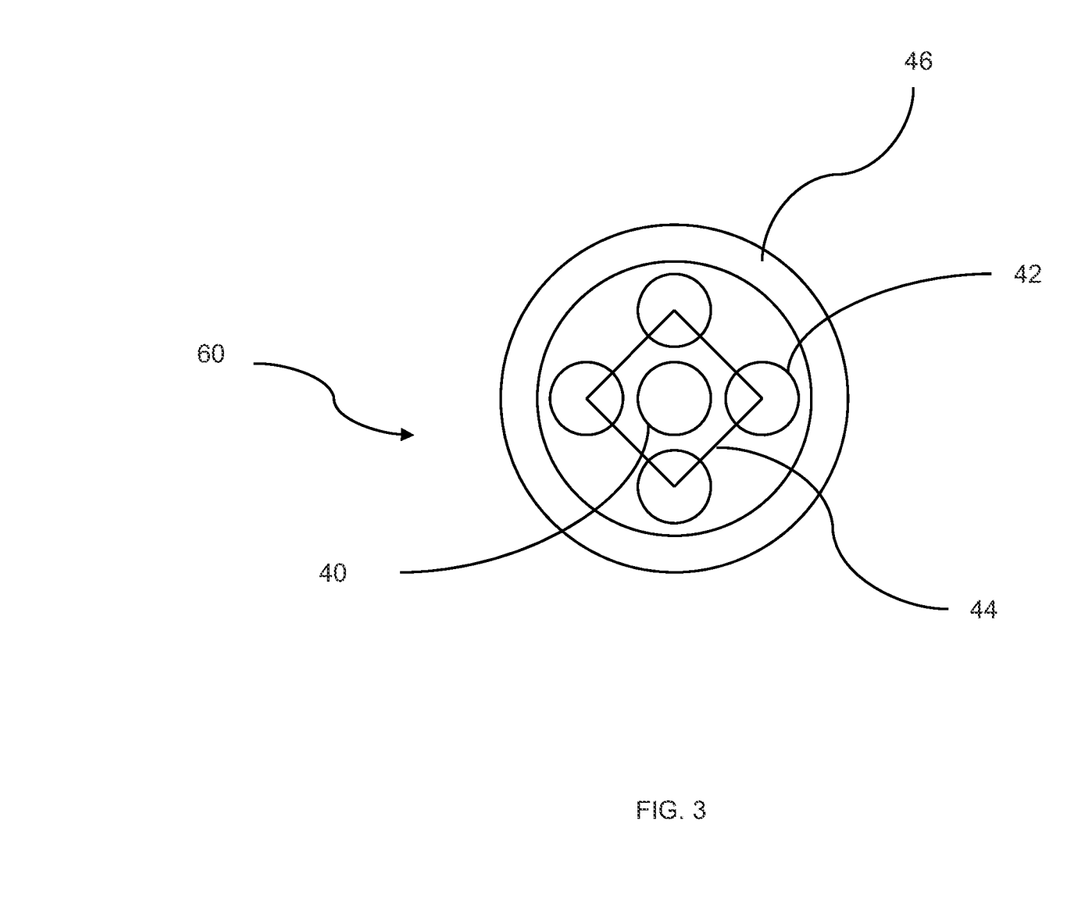
FIG. 3 is a schematic front view of part of a combining gearbox of the hybrid propulsion system of FIG. 2.

In the configuration of this embodiment, the second stage 60 is configured as a star gearbox, in which each of the sun gear 40, planet gears 42 and ring gear 46 are mounted for rotation about their respective axes, while the planet carrier 44 is statically mounted. Suitable bearing arrangements (not shown) are provided, to allow for rotation of each component, while providing the necessary support. The sun gear 40 is utilised as the first input, and so is coupled to the output gear 66 of the first stage of the combining gearbox 36. The ring gear 46 is utilised as the output, and so is coupled to the fan 12 via an output shaft 68. Consequently, the fan 12 is driveable via either or both of the gas turbine engine, and the electric motor 28, while the combining gearbox 36 also provides for reduction gearing, with the ratios being dependent on the relative number of teeth of the gears 62, 64, 66, 40, 42, 46.

It will be appreciated that the second stage 60 of the gearbox 36 could instead be configured as a planetary gearbox, in which the ring gear 46 is held static, while the planet carrier 44 is allowed to rotate. In this case, the fan 12 would be coupled to the planet carrier 44, and the ring gear 46 would be mounted to a static component. Similarly, the second stage could be replaced with a step-aside gearbox, similar to the first stage 58.

In view of the arrangement of the motor 28, gas turbine engine 10, combining gearbox 36, clutches 50, 52 and propulsor 12, the propulsion system 5 permits several operational modes.

In a first operational mode, the gas turbine engine 10 is used to drive the propulsor 12 alone. In this mode, the windings 72 of the motor 28 are not energised with electrical power from either the generator 32 or the batteries 30. In this case, the sprag clutch 50 engages in view of the torque input from the low pressure shaft 24, and the load imposed by the propulsor 12. Consequently, rotation of the low pressure shaft 24 drives the propulsor 12 via the reduction gearbox 36. However, in this mode, the sprag clutch 52 disengages, in view of the rotation of the second motor shaft 56, and the non-rotation of the first motor shaft 38. Consequently, the electric motor 38 is not driven. This is particularly advantageous where the electric motor 28 comprises a permanent magnet motor, since rotation of the rotor 78 would normally generate electrical current. This may not be desirable, as this will reduce the amount of power available to drive the propulsor 12, and will also generate additional heat. This mode of operation is also useful where the motor 28 has suffered a fault. Consequently, the motor 28 does not have to be of a "fault tolerant" type, which may reduce cost and weight.

In second operational mode, the motor 28 is used to drive the propulsor 12 alone. In this mode, the gas turbine engine 10 is shut-down. In this case, the sprag clutch 52 engages in view of the torque input from the motor 28, and the load imposed by the propulsor 12. Consequently, rotation of the motor 28 drives the propulsor 12 via the reduction gearbox 36. However, in this mode, the sprag clutch 50 disengages, in view of the rotation of the shaft 54, and the non-rotation of the low pressure shaft 24. Consequently, the gas turbine engine 10 is not driven. This mode of operation allows the gas turbine engine 10 to be shut-down in flight. Since gas turbine engines are only efficient when operated at high power, this may reduce overall fuel usage. Furthermore, the propulsor 12 can continue to be driven by the electric motor 28 in the event of a failure of the gas turbine engine 10. Again, this increases safety, and improves operational flexibility.

In a third first operational mode, the gas turbine engine 10 and the motor are used to drive the propulsor 12 together. In this mode, the windings 72 of the motor 28 are energised with electrical power from either the generator 32 or the batteries 30, and the gas turbine engine 10 is also operated to generate power. In this case, both sprag clutches 50, 52 engage in view of the torque input from the low pressure shaft 24 and the motor 28. Consequently, rotation of the low pressure shaft 24 and the motor 28 drives the propulsor 12 via the reduction gearbox 36. In this mode, load is shared between the gas turbine engine 10 and motor 28. This mode is particularly advantageous for operation at high power levels, such as take-off, where increased power is required.

Consequently, the present arrangement describes a lightweight, reliable aircraft propulsion system, which is flexible, efficient, and tolerant of failures.

Figure 8:
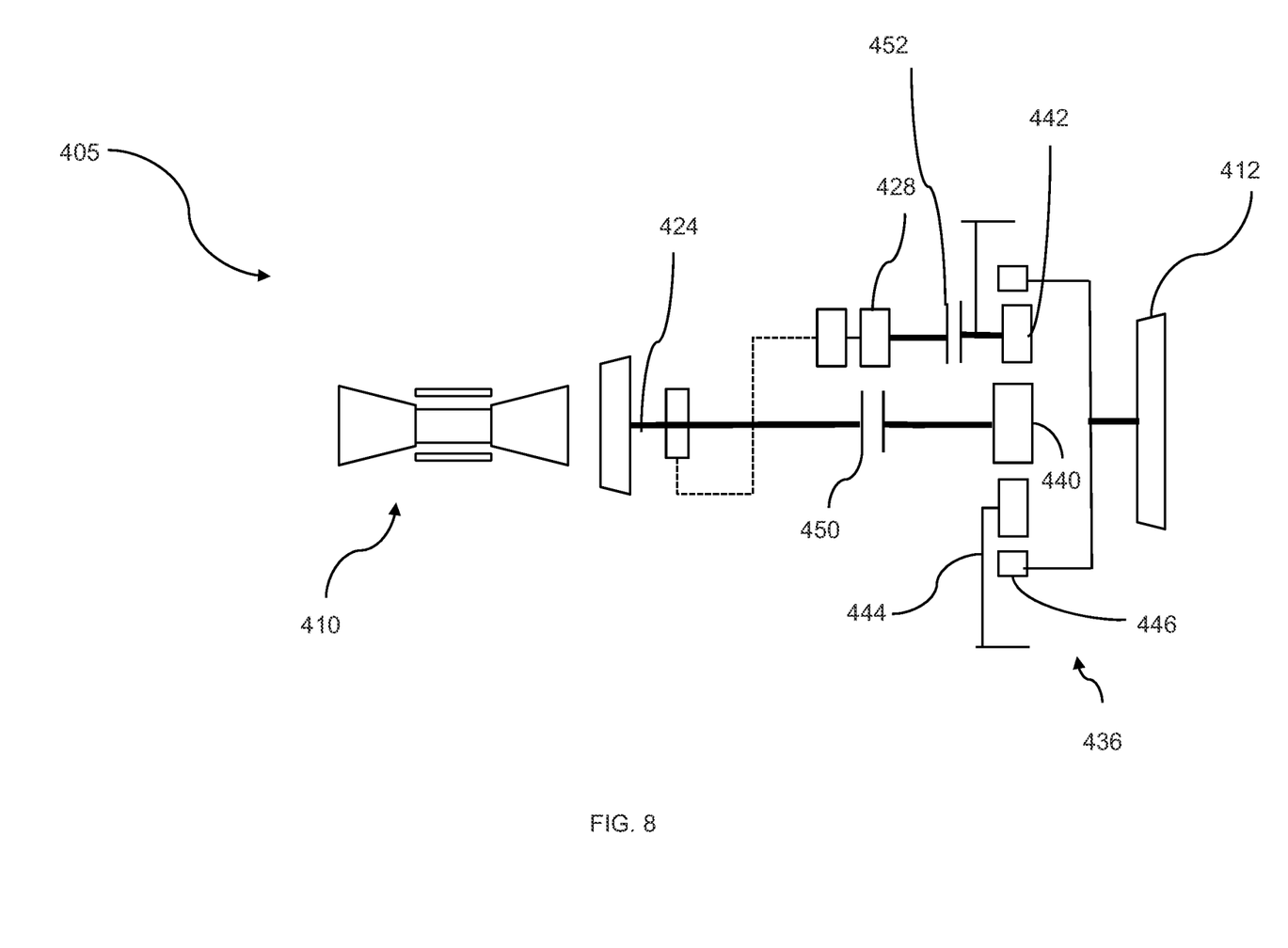
FIG. 8 is a schematic side view of an alternative propulsion system for the aircraft of FIG. 1.

Other alternative combining gearboxes could be provided. FIG. 8 illustrates one such example.

FIG. 8 shows an alternative hybrid propulsion system 405. The system 405 comprises a gas turbine engine 410, which is similar to the engine 10, and comprises an output shaft 424, which is coupled to a propulsor 412 via a combining gearbox. The system 405 also comprises an electric motor 428, which is again similar to the motor 28, and is also coupled to the propulsor 412 via the combining gearbox 436. Each of the motor 428 and gas turbine engine output shaft 424 are coupled to the combining gearbox 436 via respective clutches 450, 452, which could be of any of the types shown in FIGS. 4 to 7.

The combining gearbox 436 comprises a single stage epicyclic gearbox 436. The epicyclic gearbox comprises an input gear in the form of a sun gear 440, one or more planet gears 442 which mesh with the sun gear, a planet carrier 444 configured to rotatably mount the planet gears 442, and a ring gear 446 which meshes with the planet gears 442. The sun gear 440 is provided at a radially inner position, the ring gear 446 is provided at a radially outer position, and the planet gears 442 are provided therebetween.

The sun gear 440 is coupled to the gas turbine engine output shaft 424 via the clutch 450. One of the planet gears 442 is coupled to the motor 428 via the clutch 45s. The planet carrier 444 is statically mounted, and the ring gear 446 is mounted to the propulsor 412.

Consequently therefore, two inputs are provided into the gearbox 436, one from the gas turbine engine 410, and one from the electric motor 428. Optionally, more than one electric motor 428 could be provided, with each motor being mounted to a respective planet gear 442. Consequently, two inputs are provided, which are combined to a single output.

Again, the gearbox 436 provides reduction gearing between at least the gas turbine engine shaft 424 and the propeller 412. Typically, the reduction ratio between the motor 428 and the propeller 412 will be lower than the reduction ratio between the engine shaft 424 and propeller 412, in view of the different connections. Consequently, the reduction ratios for the motor 418 and gas turbine engine shaft 424 can be separately optimised, by controlling the number of teeth of the sun 440, planet 442 and ring gears 446.

Again, in view of the clutches 450, 452, either the engine 410 or the motor 428 can be operated independently of the other, while still allowing for rotation of the propulsor 412.

Figure 9:
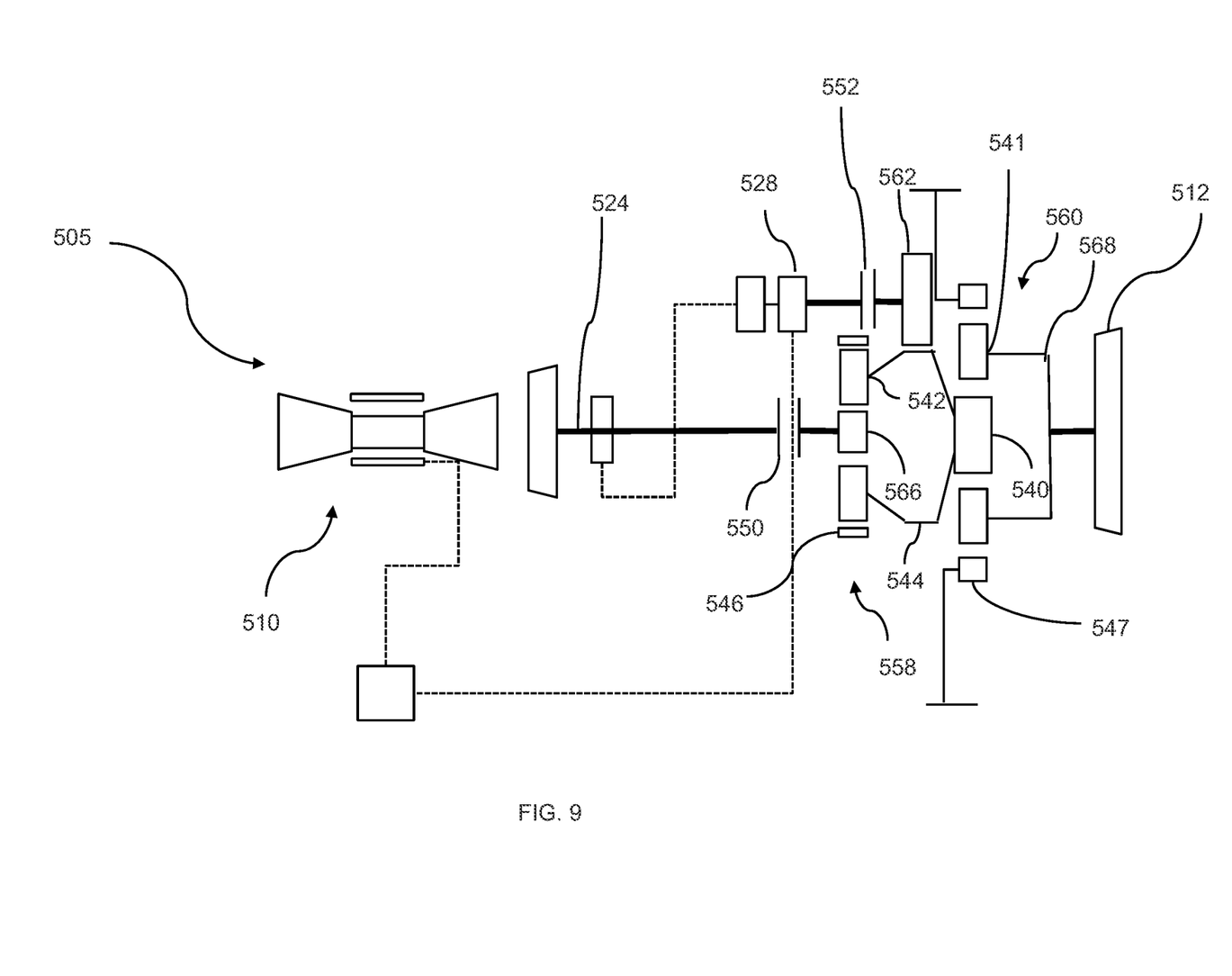
FIG. 9 is a schematic side view of further alternative propulsion system for the aircraft of FIG. 1.

FIG. 9 shows a further alternative hybrid propulsion system 405. The system 505 comprises a gas turbine engine 410, which is similar to the engine 10, and comprises an output shaft 524, which is coupled to a propulsor 512 via a combining gearbox 536. The system 505 also comprises an electric motor 528, which is again similar to the motor 28, and is also coupled to the propulsor 512 via the combining gearbox 536. Each of the motor 528 and gas turbine engine output shaft 524 are coupled to the combining gearbox 536 via respective clutches 550, 552, which could be of any of the types shown in FIGS. 4 to 7.

The combining gearbox 536 is of a different form to those of the previous embodiment, and is in the form of a two-stage epicyclic gearbox 536.

A first stage epicyclic gearbox 558 comprises an input gear in the form of a sun gear 566, one or more planet gears 542 which mesh with the sun gear 566, a planet carrier 544 configured to rotatably mount the planet gears 542, and a ring gear 546 which meshes with the planet gears 442. The sun gear 566 is provided at a radially inner position, the ring gear 546 is provided at a radially outer position, and the planet gears 542 are provided therebetween.

The sun gear 540 is coupled to the gas turbine engine output shaft 524 via the clutch 550. The planet carrier 544 comprises a toothed outer annulus, such that the planet carrier 544 also acts as a gear. A motor output gear 562 is provided, which meshes with the planet carrier teeth, such that the planet carrier 544 is driven by one or both of the gas turbine engine 510 via the sun 566 and planet gears 542, and the motor 528. The respective clutches 550, 552 are provided upstream in the drive train.

The ring gear 546 is statically mounted, and the planet carrier 544 is coupled to an input of a second stage epicyclic gearbox 560. The second stage epicyclic gearbox 560 is similar to the first stage, and again comprises an input gear in the form of a sun gear 540, one or more planet gears 541 which mesh with the sun gear 540, a planet carrier 568 configured to rotatably mount the planet gears 541, and a ring gear 547 which meshes with the planet gears 541. The sun gear 540 is provided at a radially inner position, the ring gear 547 is provided at a radially outer position, and the planet gears 541 are provided therebetween. The planet carrier 568 is mounted to the propulsor 512.

Consequently therefore, two inputs are provided into the gearbox 536, one from the gas turbine engine 510, and one from the electric motor 528. Optionally, more than one electric motor 528 could be provided, with each motor being mounted at a different position around the planet carrier 542. Consequently, two inputs are provided, which are combined to a single output.

In this arrangement, the gas turbine engine input shaft 424 and motor 428 are coupled to different elements of the gearbox 536. Consequently, the reduction gearing ratio provided between the engine 510 and the propeller 512, and between the motor 528 and the propeller 512 can be controlled independently of one another. For example, the ratio between the motor 428 and propeller 512 can be chosen by defining the diameter of the motor output gear 562 and the diameter of the planet carrier 544. Since these diameters have no effect on the reduction gear ratio provided between the engine 510 and the propeller 512 (which is defined by the relative sun gear 566, 540 and planet gear 542, 542 diameters), a designer can optimise each of these components to run at their most efficient speed, without having to compromise any of the components. Such an arrangement is also relatively compact, with relatively little width or length added to the arrangement by the addition of the motor 528 and gearing arrangement, relative to a conventional geared turboprop engine.

Again, in view of the clutches 550, 552, either the engine 510 or the motor 528 can be operated independently of the other, while still allowing for rotation of the propulsor 512.

It will be understood that the invention is not limited to the embodiments above-described and various modifications and improvements can be made without departing from the concepts described herein. For example, different gas turbine configurations could be used. Examples include single shaft gas turbine engines, and three-shaft gas turbine engines. The gas turbine engine could be replaced by a different type of internal combustion engine, such as a piston or Wankel rotary engines.

Different combining gearbox arrangements could be provided. For instance, either the epicyclic gearbox stage could be omitted, making the gearbox single-stage. As a further example, the gearbox could comprise one or more bevel gears, hypoid gears, or any other suitable gear type.

Except where mutually exclusive, any of the features may be employed separately or in combination with any other features and the disclosure extends to and includes all combinations and sub-combinations of one or more features described herein.

The invention claimed is:

1. An aircraft hybrid propulsion system comprising;
an internal combustion engine;
an electric motor;
a propulsor;
a combining gearbox, the internal combustion engine being coupled to a first input of the combining gearbox, the electric motor being coupled to a second input of the combining gearbox, and the propulsor being coupled to an output of the combining gearbox, such that the propulsor is driveable in use by either or both of the internal combustion engine and the electric motor; wherein
each of the internal combustion engine and the electric motor is coupled to its respective input by a respective clutch;
the combining gearbox comprises a multi-stage gearbox with a first stage comprising a parallel-axis gearbox, and a second stage comprising an epicyclic gearbox;
the parallel-axis gearbox comprising first and second input gears, and an output gear, wherein teeth of the first and second input gears mesh with teeth of the output gear; and
the output gear of the parallel-axis gearbox is coupled to a sun gear of the epicyclic gearbox, and one of a planet carrier and a ring gear of the epicyclic gearbox is coupled to the propulsor.

2. An aircraft hybrid propulsion system according to claim 1, wherein one or both of the clutches comprises any of an overrunning clutch, and an activated clutch such as a friction clutch or fluidic clutch.

3. An aircraft hybrid propulsion system according to claim 1, wherein the electric motor comprises one of a permanent magnet motor and an induction motor.

4. An aircraft hybrid propulsion system according to claim 1, wherein the combining gearbox comprises a reduction gearbox, wherein at least one of the inputs is configured to turn at a higher speed than the output in use.

5. An aircraft hybrid propulsion system according to claim 1, wherein the aircraft hybrid propulsion system comprises one or more of an electric energy storage device and a generator configured to provide electrical power to the electric motor.

6. An aircraft hybrid propulsion system according to claim 1, wherein the internal combustion engine comprises a gas turbine engine.

7. An aircraft hybrid propulsion system according to claim 6, wherein the gas turbine engine comprises a compressor coupled to a first turbine, and comprises a second turbine which may be de-coupled from an engine compressor.

8. An aircraft hybrid propulsion system according to claim 7, wherein the first and/or second turbine is coupled to one or both of a generator and the combining gearbox.

9. An aircraft hybrid propulsion system comprising;
an internal combustion engine drivably coupled to a sun gear of an epicyclic gearbox with a first input shaft, a first clutch disposed on the first input shaft between the internal combustion engine and the sun gear;
an electric motor drivably coupled to a planet gear of the epicyclic gearbox with a second input shaft, a second clutch disposed on the second input shaft between the electric motor and the planet gear, the planet gear located radially outward of the sun gear and configured to mesh with the sun gear;
a planet carrier fixed relative to the internal combustion engine and configured to rotably mount the planet gear;
a ring gear located radially outward of the planet gear and configured to mesh with the planet gear;
a propulsor drivably coupled to the ring gear, the propulsor being driveable in use by either or both of the internal combustion engine and the electric motor.

10. An aircraft hybrid propulsion system according to claim 9, wherein one or both of the clutches comprises any of an overrunning clutch, and an activated clutch such as a friction clutch or fluidic clutch.

11. An aircraft hybrid propulsion system according to claim 9, further comprising a second gearbox stage disposed between the propulsor and the ring gear, the second gearbox stage comprising one of a parallel-axis gearbox, and a second stage epicyclic gearbox.

12. An aircraft hybrid propulsion system according to claim 9, wherein the aircraft hybrid propulsion system comprises one or more of an electric energy storage device and a generator configured to provide electrical power to the electric motor.

13. An aircraft hybrid propulsion system according to claim 9, wherein the internal combustion engine comprises a gas turbine engine.

14. An aircraft hybrid propulsion system according to claim 13, wherein the gas turbine engine comprises a compressor coupled to a first turbine, and comprises a second turbine which may be de-coupled from an engine compressor.

15. An aircraft hybrid propulsion system according to claim 14, wherein the first and/or second turbine is coupled to one or both of the generator and the combining gearbox.

16. An aircraft hybrid propulsion system comprising;
an internal combustion engine drivably coupled to a first sun gear of a first stage epicyclic gearbox with a first input shaft, a first clutch disposed on the first input shaft between the internal combustion engine and the first sun gear;
at least one first planet gear of the first stage epicyclic gearbox located radially outward of the first sun gear and configured to mesh with the first sun gear;
a first ring gear fixed relative to the internal combustion engine located radially outward of the at least one first planet gear and configured to mesh with the at least one first planet gear;
a first planet carrier configured to rotably mount the at least one first planet gear, the first planet carrier comprising a toothed outer annulus;
an electric motor drivably coupled to a motor output gear with a second input shaft, a second clutch disposed on the second input shaft between the electric motor and the motor output gear, the motor output gear located radially outward of the first planet carrier and configured to mesh with the toothed outer annulus of the first planet carrier;
a second sun gear of a second stage epicyclic gearbox drivably coupled to the first planet carrier, the second sun gear being driveable in use by either or both of the internal combustion engine and the at least one electric motor;
at least one second planet gear of the second stage epicyclic gearbox located radially outward of the second sun gear and configured to mesh with the second sun gear;
a second ring gear fixed relative to the internal combustion engine located radially outward of the at least one second planet gear and configured to mesh with the at least one second planet gear;
a second planet carrier configured to rotably mount the at least one second planet gear; and
a propulsor drivably coupled to the second planet carrier.

17. The aircraft hybrid propulsion system of claim 16, further comprising at least one additional electric motor drivably coupled to an additional motor output gear with an additional input shaft, an additional clutch disposed on the additional input shaft between the additional electric motor and the additional motor output gear, the additional motor output gear located radially outward of the first planet carrier and configured to mesh with the toothed outer annulus of the first planet carrier.

* * * * *